US012591621B2

(12) United States Patent
Kim et al.

(10) Patent No.: US 12,591,621 B2
(45) Date of Patent: Mar. 31, 2026

(54) GENERATIVE ARTIFICIAL INTELLIGENCE AND PREFERENCE AWARE HASHTAG GENERATION

(71) Applicant: Samsung Electronics Co., Ltd., Suwon-si (KR)

(72) Inventors: Hong-Hoe Kim, Aliso Viejo, CA (US); Yingnan Zhu, Irvine, CA (US); Tomasz J. Palczewski, Danville, CA (US); Xiangyuan Zhao, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/545,037

(22) Filed: Dec. 19, 2023

(65) Prior Publication Data

US 2025/0200113 A1     Jun. 19, 2025

(51) Int. Cl.
  *G06F 16/9035*     (2019.01)
  *G06F 16/9038*     (2019.01)

(52) U.S. Cl.
  CPC ...... *G06F 16/9035* (2019.01); *G06F 16/9038* (2019.01)

(58) Field of Classification Search
  CPC .................................................. G06F 16/9035
  USPC ....................................................... 707/736
  See application file for complete search history.

(56) References Cited

U.S. PATENT DOCUMENTS

| | | | |
|---|---|---|---|
| 11,222,061 B2 | 1/2022 | Zhao et al. | |
| 11,436,508 B2 | 9/2022 | Cintas et al. | |
| 11,568,315 B2 | 1/2023 | Durand et al. | |
| 11,652,657 B2 | 5/2023 | Anchondo | |
| 2017/0052954 A1* | 2/2017 | State | G06F 16/48 |
| 2020/0302340 A1* | 9/2020 | Durand | G06N 3/045 |
| 2020/0380394 A1* | 12/2020 | Cintas | G06Q 30/0205 |
| 2022/0237384 A1* | 7/2022 | Torene | G06F 40/30 |
| 2022/0253897 A1* | 8/2022 | Hasan | G06N 20/00 |
| 2023/0283678 A1 | 9/2023 | Yong et al. | |
| 2023/0412885 A1* | 12/2023 | Wang | H04N 21/4662 |
| 2024/0257255 A1* | 8/2024 | Gupta | G06Q 40/06 |

FOREIGN PATENT DOCUMENTS

WO          2023015554 A1     2/2023

* cited by examiner

*Primary Examiner* — Muluemebet Gurmu

(57)          ABSTRACT

A method includes retrieving, using at least one processing device of an electronic device, content information related to content from a content source. The method also includes inputting, using the at least one processing device, the content information into a machine learning model, where the machine learning model is trained to recognize features of the content information. The method further includes receiving, using the at least one processing device, a plurality of predicted hashtags for the content from the machine learning model, where each one of the plurality of predicted hashtags includes a probability score. The method also includes scoring, using the at least one processing device, the plurality of predicted hashtags based on the probability score of each one of the plurality of predicted hashtags. In addition, the method includes outputting, using the at least one processing device, the at least one of the plurality of predicted hashtags.

17 Claims, 12 Drawing Sheets

300

302

500

501

600

GENERATIVE ARTIFICIAL INTELLIGENCE AND PREFERENCE AWARE HASHTAG GENERATION

TECHNICAL FIELD

This disclosure relates generally to machine learning systems. More specifically, this disclosure relates to generative artificial intelligence and preference aware hashtag generation.

BACKGROUND

Content service providers can provide content to users via a plurality of sources, such as application stores, video streaming applications, gaming applications, and music streaming applications. Content service providers can also be content consumers, such as when content service providers purchase metadata for services from third party entities. This collected metadata can be provided to users, and the users can utilize the information to choose their content. For example, content service providers can provide (1) detailed content descriptions to explain the content and (2) a genre to summarize the type of the content. However, many users still hesitate to use the metadata for their content choices because, for example, (1) metadata (such as content descriptions) can be too long to read the information and (2) metadata (such as genres) can be too abstract, requiring more detailed information for users to be able to effectively use the metadata (such as when the genre is "sports" but the user wants to find a specific game).

SUMMARY

This disclosure relates to generative artificial intelligence and preference aware hashtag generation.

In a first embodiment, a method includes retrieving, using at least one processing device of an electronic device, content information related to content from a content source. The method also includes inputting, using the at least one processing device, the content information into a machine learning model, where the machine learning model is trained to recognize features of the content information. The method further includes receiving, using the at least one processing device, a plurality of predicted hashtags for the content from the machine learning model, where each one of the plurality of predicted hashtags includes a probability score. The method also includes scoring, using the at least one processing device, the plurality of predicted hashtags based on the probability score of each one of the plurality of predicted hashtags. In addition, the method includes outputting, using the at least one processing device, the at least one of the plurality of predicted hashtags.

In a second embodiment, an electronic device includes at least one processing device configured to retrieve content information related to content from a content source. The at least one processing device is also configured to input the content information into a machine learning model, where the machine learning model is trained to recognize features of the content information. The at least one processing device is further configured to receive a plurality of predicted hashtags for the content from the machine learning model, where each one of the plurality of predicted hashtags includes a probability score. The at least one processing device is also configured to score the plurality of predicted hashtags based on the probability score of each one of the plurality of predicted hashtags. In addition, the at least one processing device is configured to output the at least one of the plurality of predicted hashtags.

In a third embodiment, a non-transitory machine-readable medium contains instructions that when executed cause at least one processor of an electronic device to retrieve content information related to content from a content source. The non-transitory machine-readable medium also contains instructions that when executed cause the at least one processor to input the content information into a machine learning model, where the machine learning model is trained to recognize features of the content information. The non-transitory machine-readable medium further contains instructions that when executed cause the at least one processor to receive a plurality of predicted hashtags for the content from the machine learning model, where each one of the plurality of predicted hashtags includes a probability score. The non-transitory machine-readable medium also contains instructions that when executed cause the at least one processor to score the plurality of predicted hashtags based on the probability score of each one of the plurality of predicted hashtags. In addition, the non-transitory machine-readable medium contains instructions that when executed cause the at least one processor to output the at least one of the plurality of predicted hashtags.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
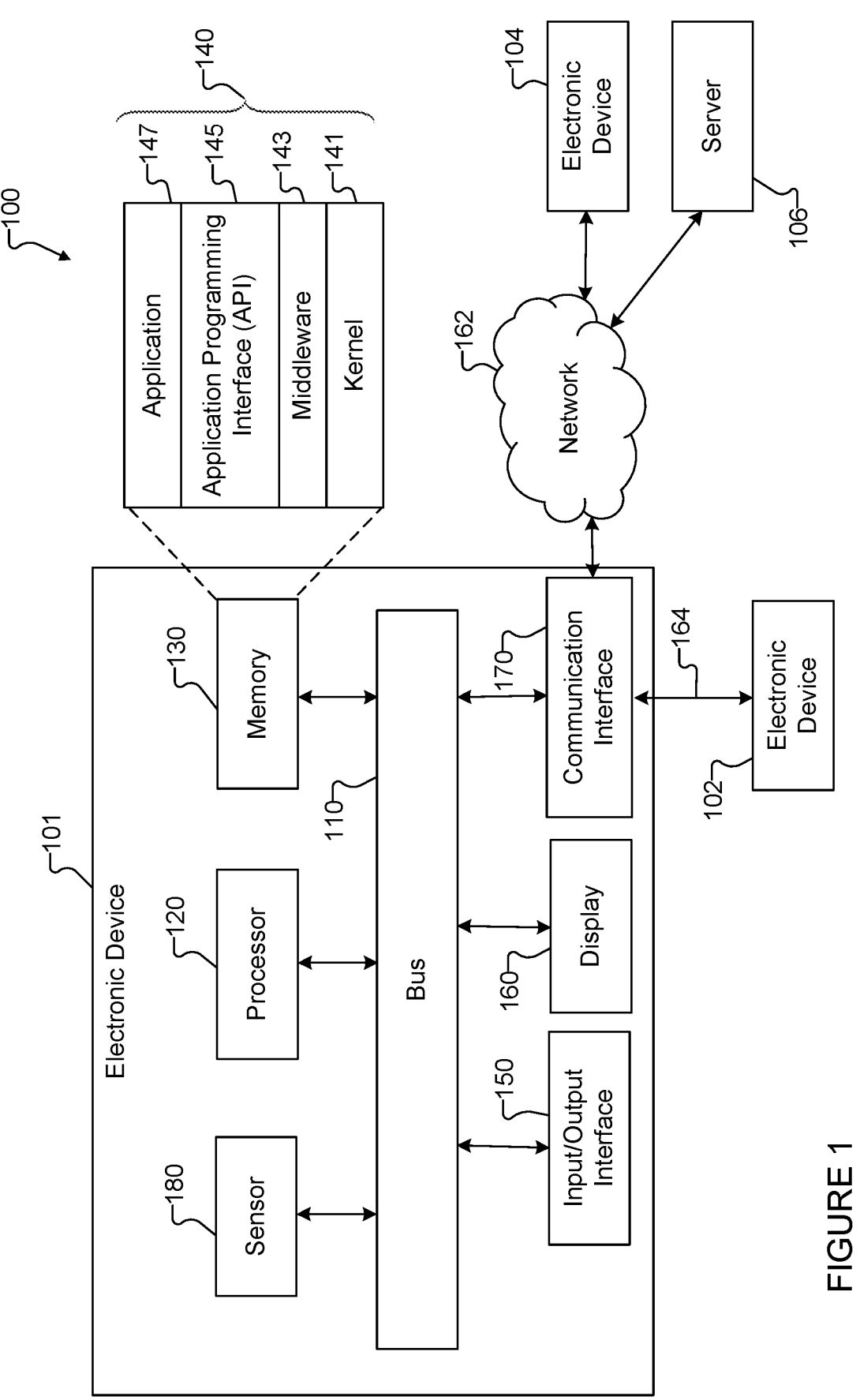
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, content service providers can provide content to users via a plurality of sources, such as application stores, video streaming applications, gaming applications, and music streaming applications. Content service providers can also be content consumers, such as when content service providers purchase metadata for services from third party entities. This collected metadata can be provided to users, and the users can utilize the information to choose their content. For example, content service providers can provide (1) detailed content descriptions to explain the content and (2) a genre to summarize the type of the content. However, many users still hesitate to use the metadata for their content choices because, for example, (1) metadata (such as content descriptions) can be too long to read the information and (2) metadata (such as genres) can be too abstract, requiring more detailed information for users to be able to effectively use the metadata (such as when the genre is "sports" but the user wants to find a specific game).

This disclosure provides hashtag generation systems and methods using artificial intelligence (AI) and machine learning that can summarize detailed content information and provide more detailed information, such as more than simply genres. As a hashtag generated by the systems and methods of this disclosure represents content with keywords, users can easily understand the nature of the content. This disclosure further provides for preference-aware hashtag generation that re-scores and reorders hashtag results to make user-favored hashtags show earlier or first according to gathered user preferences. Thus, not only does the hashtag generation provided by this disclosure include more useful information, when hashtags are provided via a service (such as a video streaming application or a gaming application), the hashtag increases engagement of users due to the readability and representational benefits of the hashtag. Additionally, this disclosure provides the benefit of allowing augmentation of hashtags into current metadata sets.

Embodiments of this disclosure provide for generative artificial intelligence generation of hashtags either without preference-awareness (generation of a universal content hashtag) or with preference-awareness (using device and/or user preferences to affect the generated hashtags) depending on the desired implementation or on any system preferences or settings. Embodiments of this disclosure include using a deep learning model, such as a deep neural network and/or large language model (LLM), to generate universal hashtags. In some embodiments, the preference-aware hashtag generation can use a deep neural network architecture that utilizes a universal hashtag result in conjunction with device and/or user preference information. The preference-aware hashtag generation can involve the use of a separate device and/or a user preference layer for performing the device/user preference determinations. Embodiments of this disclosure also provide for hashtag generation based on time information, such as altering which hashtags are presented based on a current elapsed time of a content item like a video or audio file. Embodiments of this disclosure also provide user interface elements for displaying a plurality of predicted hashtags, receiving a user input selecting a hashtag of the plurality of predicted hashtags, displaying a plurality of content items associated with the selected hashtag, and displaying a set of additional hashtags. Each hashtag of the set of additional hashtags can be displayed in association with one of the plurality of content items.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to generative AI hashtag generation. For example, as described below, the processor 120 may receive and process inputs (such as audio and/or visual content information related to content retrieved from a content source) and perform hashtag generation using the content information. For instance, the processor 120 can input the content information into a machine learning model, where the machine learning model is trained to recognize features of the content information. The processor 120 can receive a plurality of predicted hashtags for the content from the machine learning model. The plurality of predicted hashtags may each include a probability score, and the processor 120 can score and/or sort the plurality of predicted hashtags based on the probability scores and output at least one of the plurality of predicted hashtags. The processor 120 may further receive inputs (such as data samples to be used in training machine learning models) and manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to generative AI hashtag generation. For example, the application 147 can include one or more applications supporting the receipt of audio and/or visual content information related to content retrieved from a content source and performance of hashtag generation using the content information. The application 147 can also include one or more applications supporting or that are a part of one or more machine learning models that receive the content information and provide a plurality of predicted hashtags for the content. The application 147 can also include one or more applications supporting scoring/sorting of the plurality of predicted hashtags based on the probability scores of the plurality of predicted hashtags. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS- 232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to generative AI hashtag generation. For example, as described below, the server 106 may receive and process inputs (such as audio and/or visual content information related to content retrieved from a content source) and perform hashtag generation using the content information. For instance, the server 106 can input the content information into a machine learning model, where the machine learning model is trained to recognize features of the content information. The server 106 can receive a plurality of predicted hashtags for the content from the machine learning model. The plurality of predicted hashtags may each include a probability score, and the server 106 can score and/or sort the plurality of predicted hashtags based on the probability scores and output at least one of the plurality of predicted hashtags. The server 106 may further receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
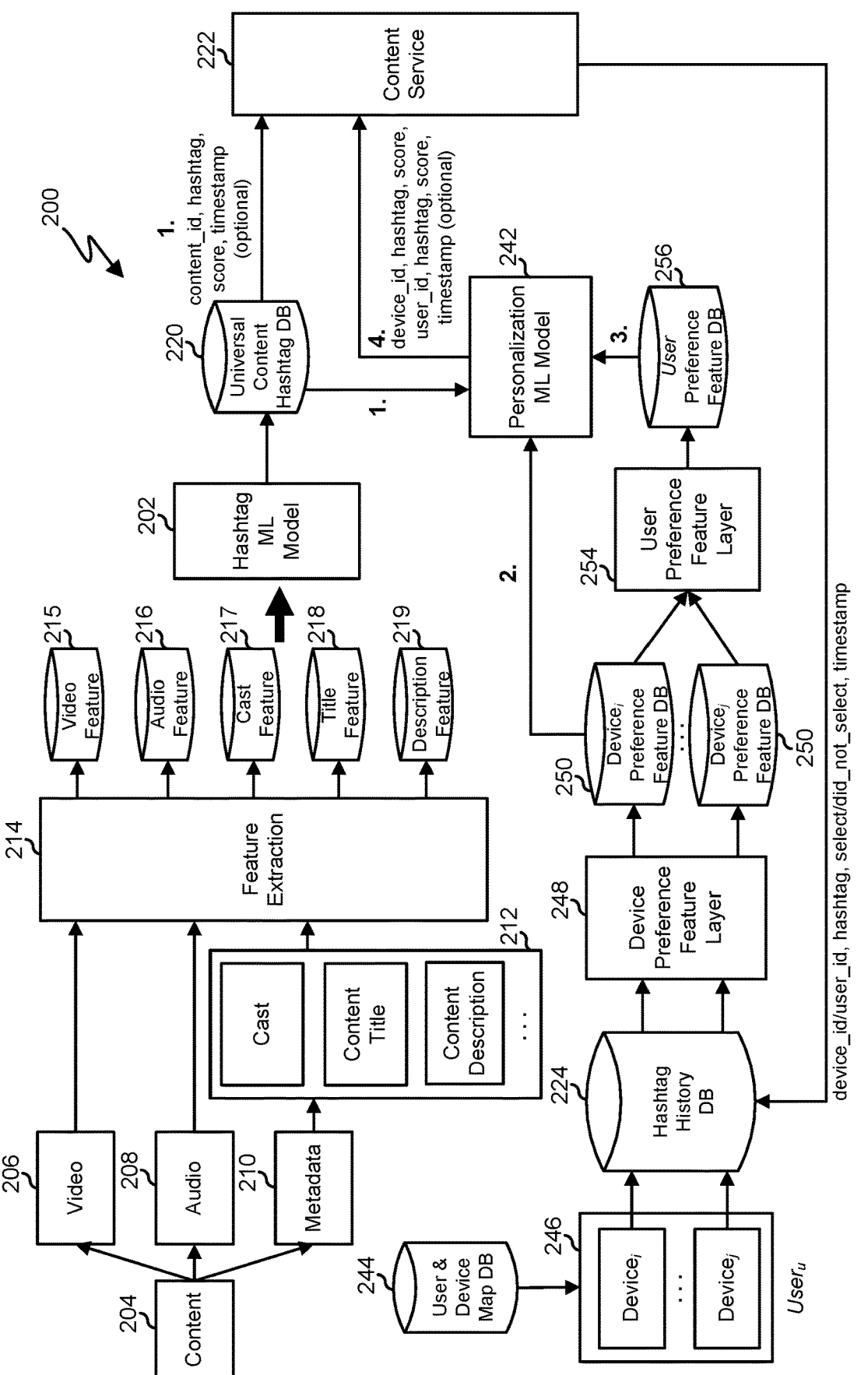
FIGS. 2A and 2B illustrate an example hashtag generation architecture in accordance with this disclosure.
Figure 2B:
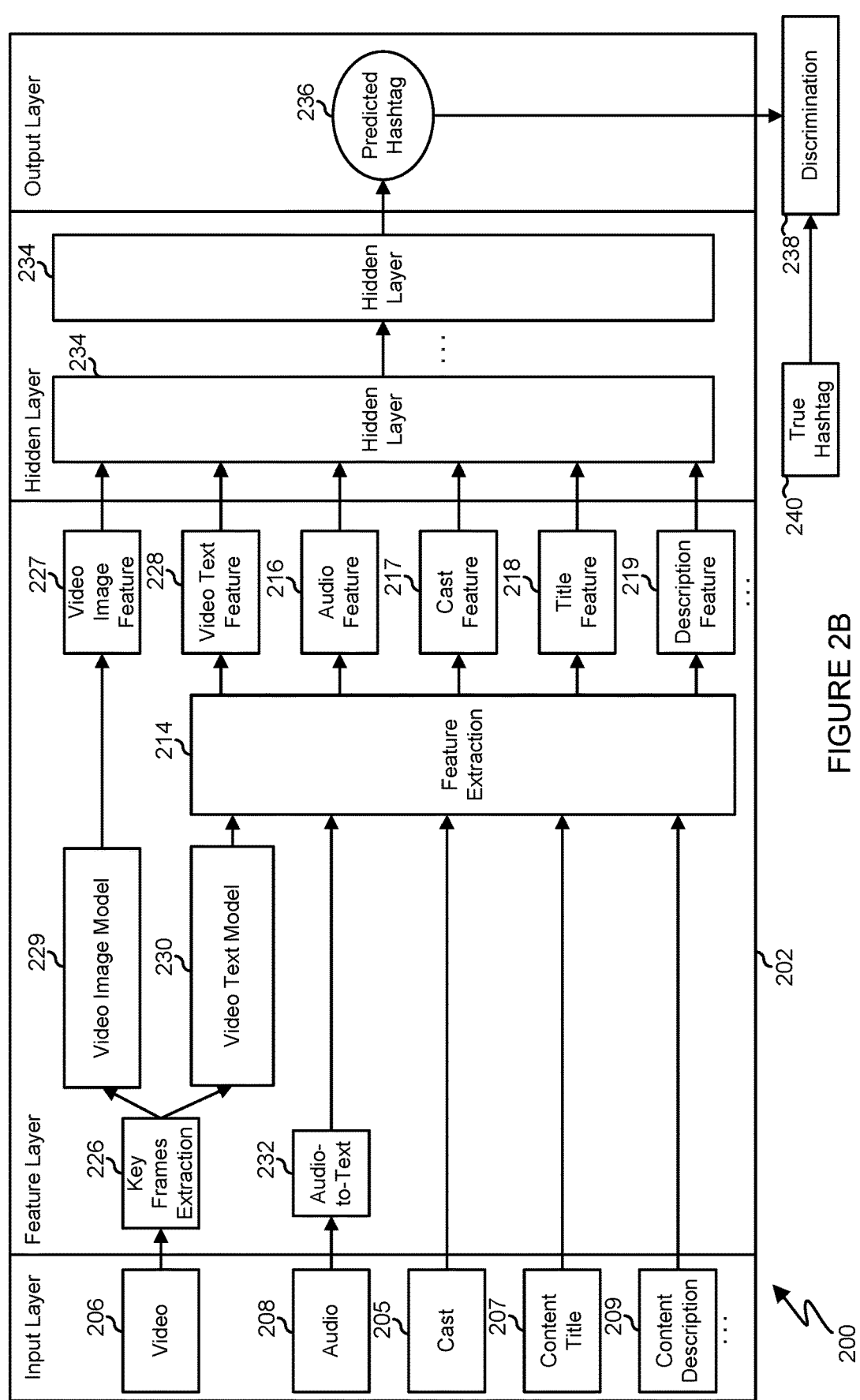

FIGS. 2A and 2B illustrate an example hashtag generation architecture 200 in accordance with this disclosure. For ease of explanation, the architecture 200 shown in FIGS. 2A and 2B is described as being implemented on or supported by the server 106 in the network configuration 100 of FIG. 1. However, the architecture 200 shown in FIGS. 2A and 2B could be used with any other suitable device(s) and in any other suitable system(s), such as when the architecture 200 is implemented on or supported by the electronic device 101.

As shown in FIG. 2A, the architecture 200 includes a hashtag machine learning (ML) model 202 that is trained to recognize features of content information and output hashtags based on the recognized features. The hashtag machine learning model 202 can be structured in various ways, such as a deep neural network and/or a large language model. The hashtag machine learning model 202 receives content information associated with content 204. The content 204 may have various data as part of or in relation to the content 204. For instance, in the example shown in FIGS. 2A and 2B, the content 204 includes video data 206, audio data 208, and metadata 210. The metadata 210 can include a plurality of information 212 related to the content, such as cast (actor) information 205 (like Gordon Ramsay, Actor1, Actor2), content title information 207 (like "Hell's Kitchen in Italy"), content description information 209 (like "Chefs are making pasta and Gordon Ramsay went crazy"), etc.

The content information related to the content 204 is provided to a feature extraction operation 214 that extracts various content features from the content information, where the content features are usable by the hashtag machine learning model 202 in predicting hashtags from the content features. As shown in FIG. 2A, the content features can include one or more of video features 215, audio features 216, cast features 217, title features 218, and description features 219. The hashtag machine learning model 202 uses the received features to output at least one universal content hashtag that can be stored in association with other information, such as a content identifier, a hashtag score, a timestamp, etc., in a universal content hashtag database 220. The timestamp can optionally be included when time information is used to affect the hashtag prediction, such as described elsewhere in this disclosure. The hashtag and related information can be provided to a content service application 222, which can present hashtags to users in one or more user interfaces and facilitate selection of hashtags by the users in order to present additional information to the users based on their selections. The content service application 222 can be one or more various application types, such as video or television streaming applications, music player applications, gaming applications, application store applications, etc. The content service application 222 can also provide feedback regarding user interactions with hashtags to a hashtag history database 224, which stores hashtags in association with information such as a user device identifier, a user identifier, indications (like a flag) of whether a user selected or did not select a hashtag, and optional timestamps.

As one example, the content can be defined as $F_C$(Content$_i$), and the metadata of the content can be defined as $F_M$(Metadata(Content$_i$)). A hashtag function H can be generated from the content and metadata as follows.

$$H(F_C(\text{Content}_i), F_M(\text{Metadata}(\text{Content}_i))) =$$

$$\prod_{i=1}^{N} (\text{Hashtag}_i, \text{Score}_i) = \text{HashtagSet}_{\text{Content}_i}$$

Here, N is the number of hashtags, and Score$_i$ is the importance or relevance value of the $i^{th}$ hashtag Hashtag$_i$ in representing the content. A higher score indicates a hashtag that reflects the content better. For example, given "Hell's Kitchen," the generated hashtags can be (#GordonRamsay, 0.8) and (#Food, 0.5), where #GordonRamsay reflects the content better than #Food due to the higher score.

As shown in FIG. 2B, in various embodiments, the hashtag machine learning model 202 can encompass the feature extraction operation 214, although in other embodiments the feature extraction operation 214 can be a separate process. As described above, the hashtag machine learning model 202 can have a generative AI structure including various model structures, such as LLM, Word2Vec, language attention model structures, or other model structures. As further shown in FIG. 2B, the hashtag machine learning model 202 can include an input layer in which the various content data, such as the video data 206, audio data 208, and metadata 210, are received.

The hashtag machine learning model 202 can further include a feature layer in which the features of the content data are extracted for use in hashtag generation using the feature extraction operation 214. The feature layer can include a key frames extraction operation 226 that extracts, from the video data 206, both video image features 227 and video text information using a video image model 229 and a video text model 230, respectively. The video text information provided by the video text model 230 describes images from the video using text (such as "Gordon is yelling at Actor1"). The video text information can be provided to the feature extraction operation 214 to generate video text features 228. The key frame extraction operation 226 can also extract video information, such as a frame index (frame$_i$), a start time (start_time$_i$), and an end time (end_time$_i$), for the video data 206. In various embodiments, the video image model can be a convolution neural network model or other machine learning model, and the video text model can be an LLM or other machine learning model.

As further shown in FIG. 2B, the audio data 208 can be converted to text using an audio-to-text operation 232. Audio text output by the audio-to-text operation 232 can be provided to the feature extraction operation 214 along with the metadata 210. The hashtag machine learning model 202 further includes a hidden layer component having one or more hidden layers 234 that receive the various content features from the feature layer and process the content features to generate at least one predicted hashtag 236. The at least one predicted hashtag 236 can also have an associated probability score. For example, based on cooking show content starring Gordon Ramsay in Italy, the hashtag machine learning model could output the following hashtags and scores: (#GordonRamsay, 0.8); (#Italy, 0.7); (#Food, 0.6); and (#Pasta, 0.55). During inferencing, the hashtag machine learning model 202 can output the at least one predicted hashtag to the content service application 222 as illustrated in FIG. 2A.

As further illustrated in FIG. 2B, during training of the hashtag machine learning model 202, the at least one predicted hashtag 236 can be provided to a discrimination operation 238 that compares each of the at least one predicted hashtag 236 with a true hashtag 240. In some embodiments, the true hashtag 240 can be a human label associated with the training data. The true hashtag 240 acts as a ground truth representing the expected or correct prediction that is desired to be provided by the hashtag machine learning model 202.

Using the predicted hashtag 236 and the true hashtag 240, the processor 120 can determine an error or loss using a loss function and modify the hashtag machine learning model 202 based on the error or loss. The loss function calculates the error or loss associated with the predictions of the hashtag machine learning model 202. For example, when the outputs of the hashtag machine learning model 202 differ from the ground truths, the differences can be used to calculate a loss as defined by the loss function. The loss function may use any suitable measure of loss associated with outputs generated by the hashtag machine learning model 202, such as a cross-entropy loss or a mean-squared error. When the loss calculated by the loss function is larger than desired, the parameters of the hashtag machine learning model 202 can be adjusted. Once adjusted, the same or additional training data can be provided to the adjusted hashtag machine learning model 202, and additional outputs from the hashtag machine learning model 202 can be compared to the ground truths so that additional losses can be determined using the loss function. Over time, the hashtag machine learning model 202 produces more accurate outputs that more closely match the ground truths, and the measured loss becomes less. At some point, the measured loss can drop below a specified threshold, and the training of the hashtag machine learning model 202 can be completed.

Referring again to FIG. 2A, the architecture 200 can be used in a first scenario, indicated by path number 1 in FIG. 2A, in which a universal content hashtag is generated without utilizing preference information. In various embodiments, however, to further improve the ability of a hashtag to increase user engagement, the architecture 200 can include components that allow for displaying a user or device preferred hashtag, such as before other predicted hashtags. The architecture can thus provide a preference-aware hashtag function Ĥ, which in some cases may be expressed as follows.

$$\hat{H}\left(HashtagSet_{Content_i}, F_u(\text{User/device}_j)\right) = \prod_{i=1}^{N} (\text{Hashtag}_i, \text{Score}_i')$$

Here, $F_u$ represents user/device preference information, and $\text{Score}_i'$ reflects a personalized score.

Hashtags with personalized scores can be provided using a personalization machine learning model 242 that is trained to consolidate features included in hashtag preference information associated with the one or more hashtags and output preference features. As shown in FIG. 2A, the architecture 200 can be used in a second scenario that generates device-level preference-aware hashtags, indicated by a combination of path numbers 1, 2, and 4 in FIG. 2A. The architecture 200 can also be used in a third scenario that generates user-level preference-aware hashtags, indicated by a combination of path numbers 1, 3, and 4 in FIG. 2A.

When using device-level preference-aware hashtags, a universal content hashtag can be generated as described above using the hashtag machine learning model 202. A user and device map database 244 can be used to retrieve information associated with a user device (such as Device$_i$) associated with a user 246 (User$_u$). The hashtag history database 224 is accessed for that user device to discover how the user 246 has interacted with a particular hashtag, such as whether or not the user has ever selected a hashtag when presented with the hashtag by the content service application 222. In some embodiments, the hashtag history database 224 can store other preference information, such as information gathered from the associated user device (like contacts, song lists, video libraries, etc.) that can be used to determine whether the user has a preference for certain content.

The data retrieved from the hashtag history database 224 can be processed using a device preference features layer 248 that generates specific preference features from the data retrieved from the hashtag history database 224. The preference features generated by the device preference features layer 248 can be stored in a preference feature database, such as a device preference feature database 250 associated with the user device (like Device$_i$). When using device-level preference-awareness for hashtag generation, the device-level preference features are provided from the preference feature database to the personalization machine learning model 242, which can re-score hashtags generated by the hashtag machine learning model 202 based on the device-level preference features. For example, if a universal hashtag generated by the hashtag machine learning model 202 is #GordonRamsay with a score of 0.8 but the device-level preference features indicate that the user does not have a preference for Gordon Ramsay and/or if the device-level preference features indicate that other content associated with other hashtags are preferred, the personalization machine learning model can re-score #GordonRamsay to have a lower score. Device-level preference information, including a device identifier, one or more hashtags, one or more scores, and optional timestamps can be provided to the content service application 222, such as to display the hashtags options to the user.

When using user-level preference-aware hashtags, a universal content hashtag can be generated as described above using the hashtag machine learning model 202. The user and device map database 244 can be used to retrieve information associated with multiple user devices (such as Device$_i$ through Device$_j$) associated with the user 246 so that the user's preferences can be aggregated across devices, which can be of different device types (such as smartphones, smart televisions, smart refrigerators, wearable devices, etc.). The hashtag history database 224 is accessed for those user devices to discover how the user 246 has interacted with a particular hashtag using the multiple user devices, such as whether or not the user has ever selected a hashtag when presented with the hashtag by the content service application 222. In some embodiments, the hashtag history database 224 can store other preference information associated with the multiple devices, such as information gathered from the associated user device (like contacts, song lists, video libraries, etc.) that can be used to determine whether the user has a preference for certain content.

The data retrieved from the hashtag history database 224 can be processed using the device preference features layer 248 to generate specific preference features from the data retrieved from the hashtag history database 224. In some embodiments, the preference features generated by the device preference features layer 248 can be stored in multiple device preference feature databases 250, such as in different device preference features databases 250 associated with different user devices (like Device$_j$ through Device$_j$). It will be understood that any number of user devices and any number of preference features databases can be used.

When using user-level preference-awareness for hashtag generation, the device preference features for each user device are provided from the device preference feature databases 250 to a user preference feature layer 254 that processes the device-level preferences and combines them into user-level preferences, which can be stored in a user preference features database 256. The user preference features are provided to the personalization machine learning model 242, which can re-score hashtags generated by the hashtag machine learning model 202 based on the user-level preference features. For example, if a universal hashtag generated by the hashtag machine learning model 202 is #GordonRamsay with a score of 0.8 but the combined user-level preference features indicate that the user does not have a preference for Gordon Ramsay and/or if the user-level preference features indicate that other content associated with other hashtags are preferred, the personalization machine learning model can re-score #GordonRamsay to have a lower score. User-level preference information, including device identifiers, a user identifier, one or more hashtags, one or more scores, and optional timestamps can be provided to the content service application 222, such as to display the hashtags options to the user.

Although FIGS. 2A and 2B illustrate one example of a hashtag generation architecture 200, various changes may be made to FIGS. 2A and 2B. For example, various components and functions in FIGS. 2A and 2B may be combined, further subdivided, replicated, or rearranged according to particular needs. Also, one or more additional components and functions may be included if needed or desired. As a particular example, in some cases, the hashtag machine learning model 202, the personalization machine learning model 242, and/or any other machine learning models can be stored as separate models called upon by the processor 120 to perform certain tasks or can be included in and form a part of one or more larger machine learning models.

Figure 3:
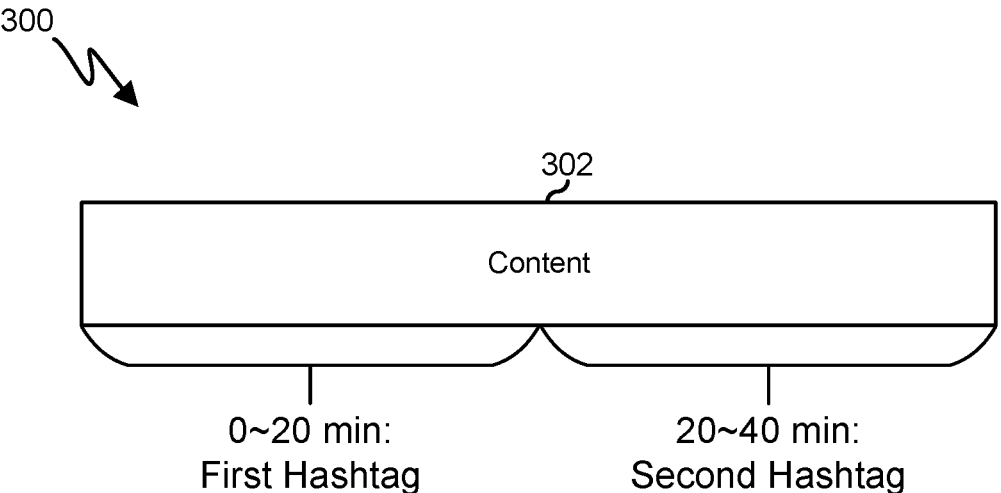
FIG. 3 illustrates an example process for generating hashtags based on time information in accordance with this disclosure.

FIG. 3 illustrates an example process 300 for generating hashtags based on time information in accordance with this disclosure. For ease of explanation, the process 300 shown in FIG. 3 is described as being implemented on or supported by the server 106 in the network configuration 100 of FIG. 1. However, the process 300 could be used with any other suitable device(s) and in any other suitable system(s), such as when the process 300 is implemented on or supported by the electronic device 101.

In some cases, a content item can have different hashtags generated based on the nature of the content at different playback times, such as if a video or audio content item at different points in time presents different subject matter. For example, as shown in FIG. 3, a content item 302 is analyzed to determine that a first hashtag is associated with the content item 302 at one or more points in time and a second hashtag is associated with the content item 302 at one or more other points in time. In the example of FIG. 3, the first hashtag is associated with the content item 302 between the 0 and 20 minute markers of the content, and the second hashtag is associated with the content item 302 between the 20 and 40 minute markers of the content. Of course, these values are for illustration only.

As a particular example, suppose that universal hashtags are generated for the content item 302 and include the hashtags #Food, #ChineseFood, and #ItalianFood. As described with respect to FIGS. 2A and 2B, these hashtags can be associated with content timestamps based on when the subject matter appears in the content item 302. For instance, if the first 20 minutes of the content item 302 deals with Italian food, one or more timestamps can be associated with the #ItalianFood hashtag indicating that Italian food is the subject of the first 20 minutes of the content item 302. Additionally, if the second 20 minutes of the content item 302 deals with Chinese food, one or more timestamps can be associated with the #ChineseFood hashtag indicating that Chinese food is the subject of the second 20 minutes of the content item 302.

The timestamps can be used to display the hashtags to users at different times, as well. For example, the #Italian-Food hashtag can be presented to the user while the user views the first 20 minutes of the content item 302. Once 20 minutes of the content item have elapsed, the display of the #ItalianFood hashtag can be removed and replaced by display of the #ChineseFood hashtag. If the content item 302 is not being played back and/or if it is before an airing time of the content item 302, all hashtags can be displayed to the user along with their associated times at which they appear in the content.

Although FIG. 3 illustrates one example of a process 300 for generating hashtags based on time information, various changes may be made to FIG. 3. For example, while just two time periods and two associated hashtags are illustrated in FIG. 3, it will be understood that any number of time periods and associated hashtags can be used depending on the nature of the particular content item.

Figure 4:
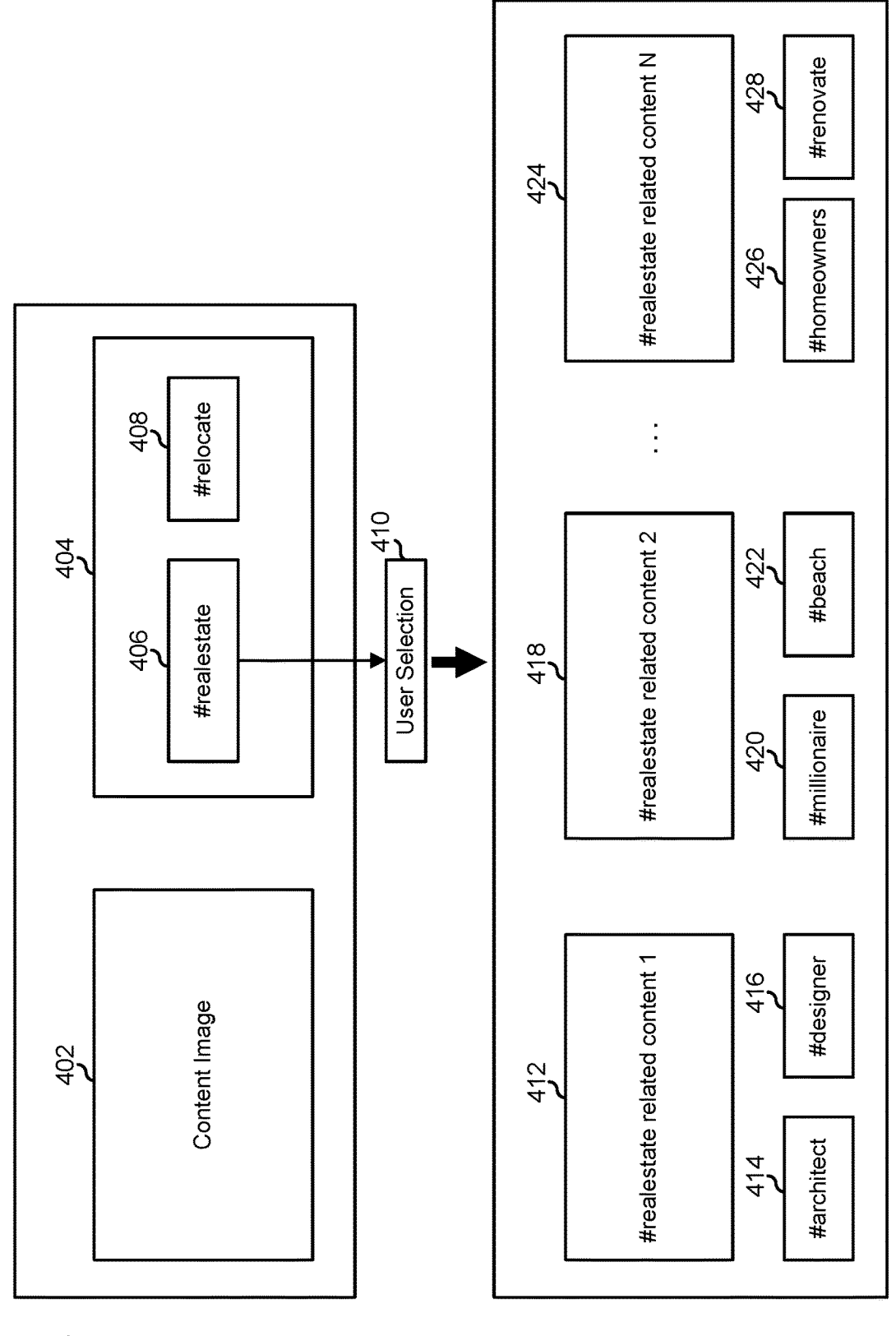
FIG. 4 illustrates an example process for displaying hashtags and related content in accordance with this disclosure.

FIG. 4 illustrates an example process 400 for displaying hashtags and related content in accordance with this disclosure. For ease of explanation, the process 400 shown in FIG. 4 is described as being implemented on or supported by the electronic device 101 in the network configuration 100 of FIG. 1. However, the process 400 could be used with any other suitable device(s) and in any other suitable system(s), such as when the process 400 is implemented on or supported by the server 106.

As described with respect to FIGS. 2A and 2B, generated hashtags (such as those generated using the architecture 200) can be displayed to users (such as via the content service application 222) using a user interface shown on a display (such as the display 160). As shown in FIG. 4, the process 400 includes displaying a content image 402 associated with a content item along with a hashtag display area 404 that includes one or more hashtags associated with the content item. In some embodiments, each hashtag can be displayed as or in association with a button or another type of user interface object. For instance, in this example, the content includes subject matter related to real estate and relocating, and a #realestate hashtag 406 and a #relocate hashtag 408 are displayed in the hashtag display area 404.

The user interface can include functionality allowing users to select one of the hashtags displayed in the hashtag display area 404, such as via a click or touch input. Based on a selection of one of the displayed hashtags, a user selection 410 is generated. Based on the generated user selection 410, the process 400 includes updating the user interface to display one or more content items related to the selected hashtag, as well as displaying at least one hashtag in association with each related content item.

As a particular example, as shown in FIG. 4, the interface is updated based on a user selection of the #realestate hashtag 406 to display a plurality of related content items 412, 418, 424. The first related content item 412 includes subject matter regarding architects and designers, and a #architect hashtag 414 and a #designer hashtag 416 are displayed in association with the first related content item 412. The second related content item 418 includes subject matter regarding millionaires and beaches, and a #million-aire hashtag 420 and a #beach hashtag 422 are displayed in association with the second related content item 418. The N related content item 424 includes subject matter regarding homeowners and renovations, and a #homeowner hashtag 426 and a #renovate hashtag 428 are displayed in association with the N related content item 424. In various embodiments, each of the hashtags displayed in association with the related content items 412, 418, 424 can also be selected by a user to generate yet additional content items and associated hashtags in a similar manner as described with respect to the user selection 410.

Although FIG. 4 illustrates one example of a process 400 for displaying hashtags and related content, various changes may be made to FIG. 4. For example, while certain hashtag and content subject matter is shown in FIG. 4 for illustrative purposes, it will be understood that any subject matter and associated hashtags can be used depending on the nature of the particular content items.

Figure 5A:
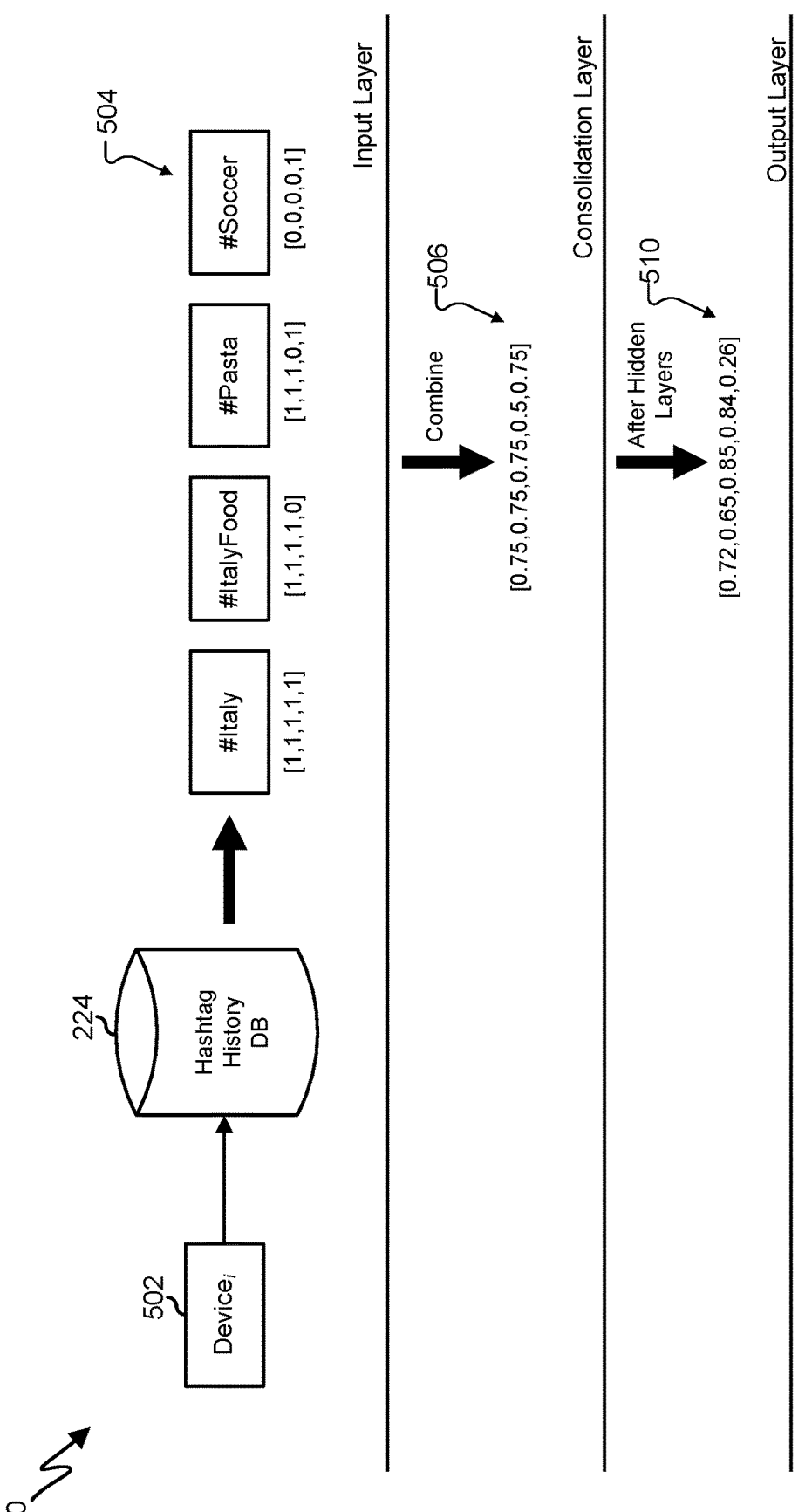
FIGS. 5A and 5B illustrate an example process for generating device or user preference features using a preference features machine learning model in accordance with this disclosure.
Figure 5B:
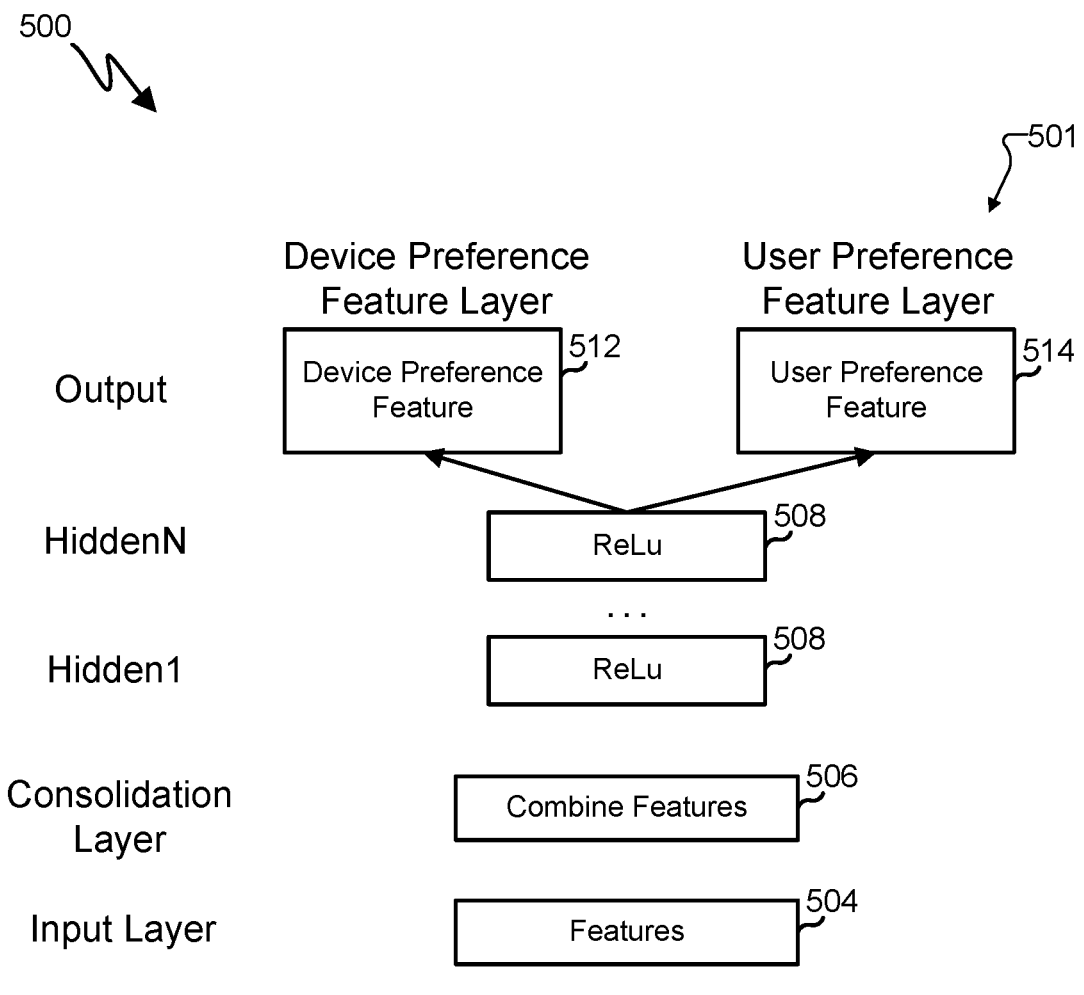

FIGS. 5A and 5B illustrate an example process 500 for generating device or user preference features using a preference features machine learning model 501 in accordance with this disclosure. For ease of explanation, the process 500 shown in FIGS. 5A and 5B is described as being implemented on or supported by the server 106 in the network configuration 100 of FIG. 1. However, the process 500 could be used with any other suitable device(s) and in any other suitable system(s), such as when the process 500 is implemented on or supported by the electronic device 101.

As described with respect to FIGS. 2A and 2B, device-level or user-level preference features can be used to affect the scoring, sorting, and display of hashtags initially generated by the hashtag machine learning model 202. As shown in FIG. 5A, a user device 502 can have device information stored in the hashtag history database 224, where the hashtag machine learning model 202 stores each hashtag in relation to user selection history and in relation to hashtag feature information. In the example of FIG. 5A, a plurality of hashtags and their associated features 504 are retrieved from the hashtag history database 224. Each of the hashtag features 504 may be a vector of values as shown in FIG. 5A.

As shown in FIGS. 5A and 5B, the hashtag features 504 are provided to an input layer of the preference features machine learning model 501. The preference features machine learning model 501 can be or include the device preference feature layer 248 and/or the user preference feature layer 254 of FIG. 2A. A consolidation layer of the preference features machine learning model 501 combines the hashtag features 504, such as by calculating an average, a maximum, etc. of the hashtag features 504. The combined features 506 are processed by one or more hidden layers 508. In some embodiments, the hidden layers 508 can be rectified linear unit (ReLu) layers, but the hidden layers 508 can be structured in other ways depending on the model structure of the preference features machine learning model 501. The structure of the preference features machine learning model 501 can be neural network with a fully connected layer as shown or can be of other model structures, such as a long short-term memory (LSTM) structure.

After the combined features are processed using the hidden layers 508, an output layer of the preference features machine learning model 501 outputs generated preference features 510. The preference features 510 can be used by the personalization machine learning model 242 to adjust hashtag information for universal hashtags generated by the hashtag machine learning model 202, such as hashtag scores and hashtag sorting. As shown in FIG. 5B, the output layer can output either device preference features 512 or user preference features 514 as the preference features 510. For the user preference features 514, the preference features machine learning model 501 can take the device preference features from multiple devices associated with a user as inputs in the input layer. The device preference features 512 can be stored in the device preference features databases 250, and the user preference features 514 can be stored in the user preference features database 256.

Although FIGS. 5A and 5B illustrate one example process 500 for generating device or user preference features using a preference features machine learning model 501, various changes may be made to FIGS. 5A and 5B. For example, while shown as a series of steps, various steps in FIGS. 5A and 5B could overlap, occur in parallel, occur in a different order, or occur any number of times (including zero times). Also, while certain hashtags are shown in FIGS. 5A and 5B for illustrative purposes, it will be understood that any subject matter and associated hashtags can be used depending on the nature of the particular content items.

Figure 6A:
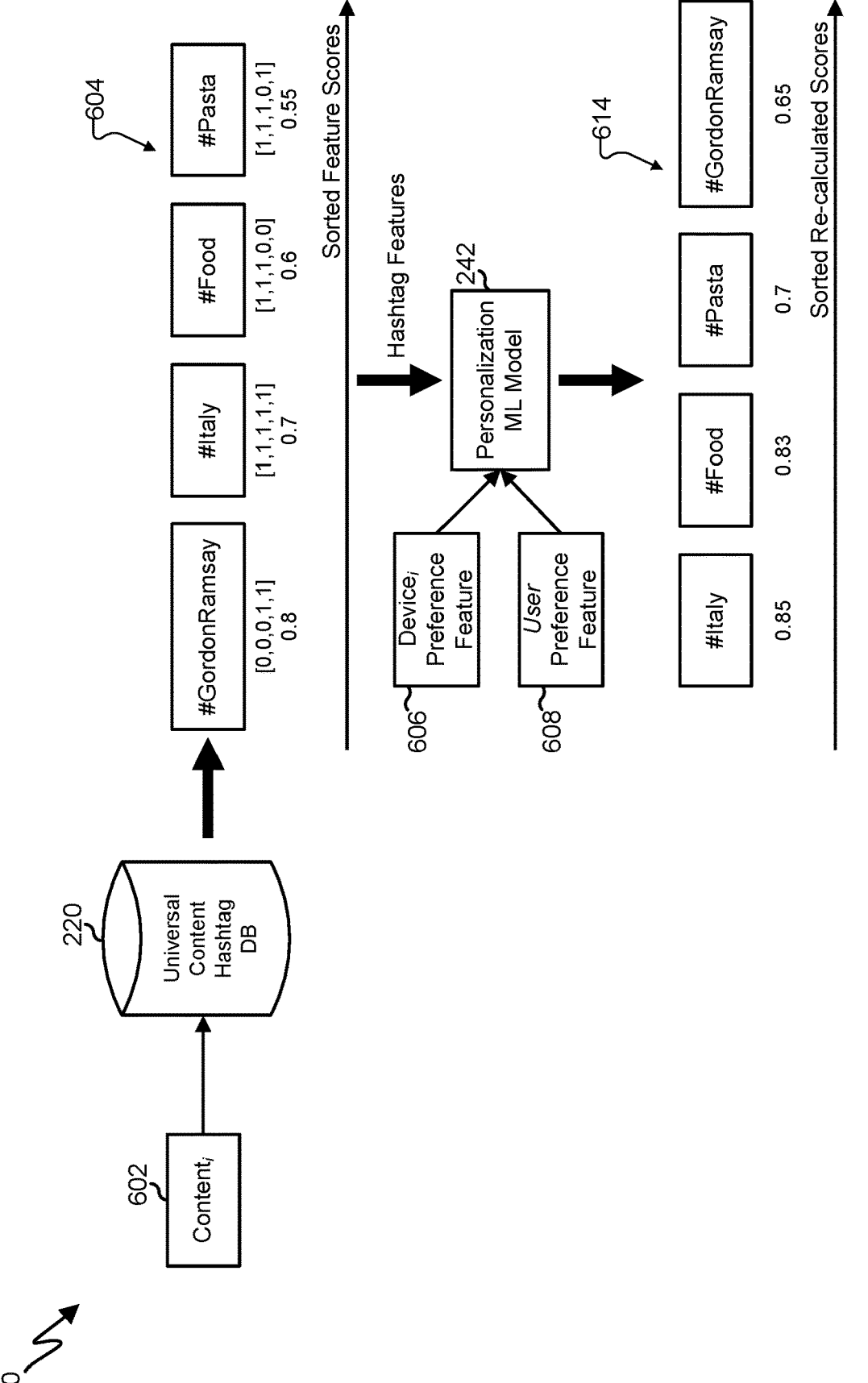
FIGS. 6A and 6B illustrate an example process for generating personalized hashtags using a personalization machine learning model in accordance with this disclosure.
Figure 6B:
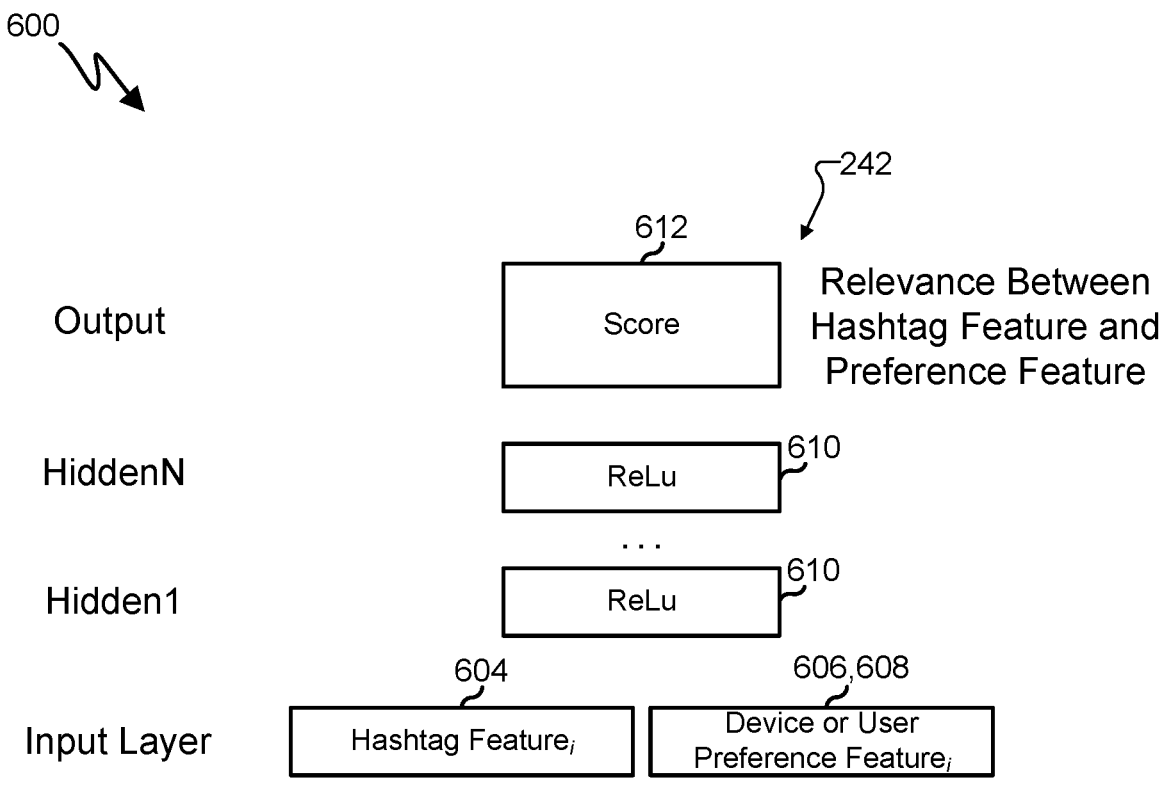

FIGS. 6A and 6B illustrate an example process 600 for generating personalized hashtags using the personalization machine learning model 242 in accordance with this disclosure. For ease of explanation, the process 600 shown in FIGS. 6A and 6B is described as being implemented on or supported by the server 106 in the network configuration 100 of FIG. 1. However, the process 600 could be used with any other suitable device(s) and in any other suitable system(s), such as when the process 600 is implemented on or supported by the electronic device 101.

As described with respect to FIGS. 2A and 2B, device-level or user-level preference features can be used to affect the scoring, sorting, and display of hashtags initially generated by the hashtag machine learning model 202. As shown in FIG. 6A, a content item 602 can have various hashtags and associated hashtag features and scores stored in the universal content hashtag database 220. In the example of FIG. 6A, a plurality of hashtags and their associated features 604 are retrieved from the universal content hashtag database 220.

As shown in FIGS. 6A and 6B, the hashtag features 604 are provided to an input layer of the personalization machine learning model 242 along with device preference features 606 or user preference features 608, depending on whether device-level or user-level preferences are to be used. The hashtag features 604 and the device or user preference features 606, 608 are processed by one or more hidden layers 610 of the personalization machine learning model 242. In some embodiments, the hidden layers 610 can be ReLu layers, but the hidden layers 610 can be structured in other ways depending on the model structure of the personalization machine learning model 242.

At an output layer, the personalization machine learning model 242 outputs scores 612 for the hashtags that indicate a relevance between the hashtag features and the preference features such that the original scores of the hashtags retrieved from the universal content hashtag database 220 are re-scored. Re-scored hashtags 614 can be re-sorted according to their scores so that higher scoring hashtags can be displayed earlier or first to users. For instance, as shown in the example of FIG. 6A, suppose the universal hashtags and scores generated by the hashtag machine learning model 202 are (#GordonRamsay, 0.8), (#Italy, 0.7), (#Food, 0.6), and (#Pasta, 0.55). The personalization machine learning model 242 can adjust the score for each of these hashtags based on the device or user preference features to re-score the hashtags and re-sort the hashtags according to their updated scores. For example, as shown in FIG. 6A, the re-scored and re-sorted hashtags output by the personalization machine learning model 242 are (#Italy, 0.85), (#Food, 0.83), (#Pasta, 0.7), and (#GordonRamsay, 0.65), indicating that a user did not have a preference for Gordon Ramsay and/or that other content associated with other hashtags is preferred.

Although FIGS. 6A and 6B illustrate one example process 600 for generating personalized hashtags using the personalization machine learning model 242, various changes may be made to FIGS. 6A and 6B. For example, while shown as a series of steps, various steps in FIGS. 6A and 6B could overlap, occur in parallel, occur in a different order, or occur any number of times (including zero times). Also, while certain hashtags are shown in FIGS. 6A and 6B for illustrative purposes, it will be understood that any subject matter and associated hashtags can be used depending on the nature of the particular content items.

Figure 7:
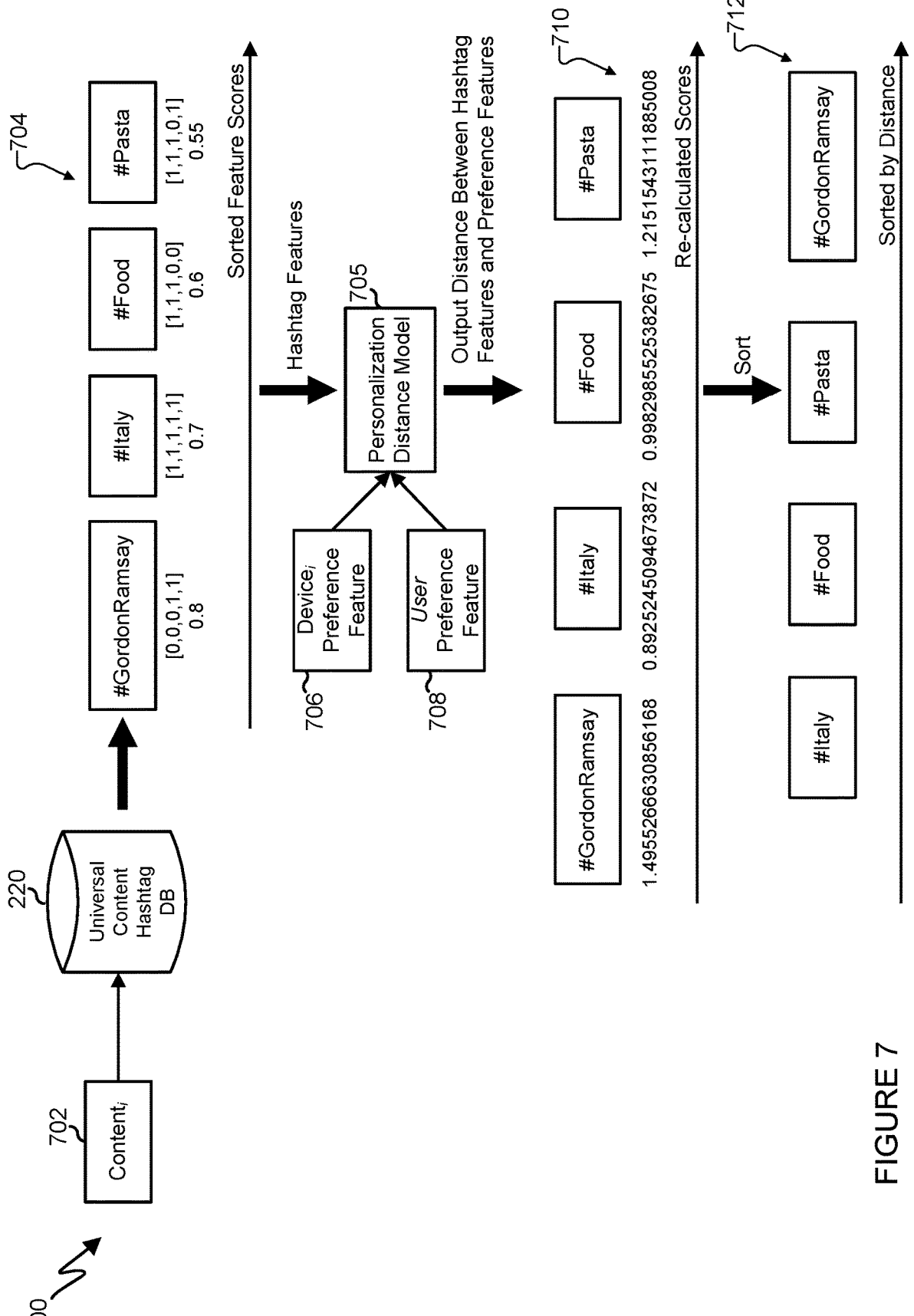
FIG. 7 illustrates an example process for generating personalized hashtags using feature distance in accordance with this disclosure.

FIG. 7 illustrates an example process 700 for generating personalized hashtags using feature distance in accordance with this disclosure. For ease of explanation, the process 700 shown in FIG. 7 is described as being implemented on or supported by the server 106 in the network configuration 100 of FIG. 1. However, the process 700 could be used with any other suitable device(s) and in any other suitable system(s), such as when the process 700 is implemented on or supported by the electronic device 101.

As described with respect to FIGS. 2A and 2B, device-level or user-level preference features can be used to affect the scoring, sorting, and display of hashtags initially generated by the hashtag machine learning model 202. In some embodiments, instead of using a machine learning model (such as the personalization machine learning model 242), a personalization distance model 705 can be used to calculate distances (such as Euclidean distances or dot product distances) between the universal hashtag features and the device or user preference features. As shown in FIG. 7, a content item 702 can have various hashtags and associated hashtag features and scores stored in the universal content hashtag database 220. In the example of FIG. 7, a plurality of hashtags and their associated features 704 are retrieved from the universal content hashtag database 220. The hashtag features 704 can also include values representing probability scores for hashtags.

The hashtag features 704 are provided to the personalization distance model 705 along with device-level preference features 706 or user-level preference features 708, depending on whether device-level or user-level preferences are to be used. The personalization distance model 705 calculates the distances between the universal hashtag features 704 and either the device-level preference features 706 or the user-level preference features 708 and outputs a distance metric 710 for each of the hashtags.

The distance metrics 710 for the hashtags are used to re-sort the hashtags according to the closest distance between the universal hashtag features 704 and either the device-level preference features 706 or the user-level preference features 708, and re-sorted hashtags 712 are output. For instance, as shown in the example of FIG. 7, suppose the universal hashtags and features generated by the hashtag machine learning model 202 are (#GordonRamsay, [0,0,0, 1,1]), (#Italy, [1,1,1,1,1]), (#Food, [1,1,1,0,0]), and (#Pasta, [1,1,1,0,1]). The personalization distance model 705 can determine the distances between the hashtag features and the preference features.

As a particular example, if the device's preference features were [0.72,0.65, 0.85,0.84,0.26], the determined distances for the hashtags as shown in the example of FIG. 7 could be (#GordonRamsay, 1.4955266630856168), (#Italy, 0.8925245094673872), (#Food, 0.9982985525382675), and (#Pasta, 1.2151543111885008), where higher numbers represent greater distances. Thus, as shown in the example of FIG. 7, the hashtags can be re-sorted based on their distances. Here, this means the hashtags are re-sorted to be in the order of #Italy, #Food, #Pasta, and #GordonRamsay, again indicating that a user did not have a preference for Gordon Ramsay and/or that other content associated with other hashtags is preferred.

Although FIG. 7 illustrates one example process 700 for generating personalized hashtags using feature distance, various changes may be made to FIG. 7. For example, while shown as a series of steps, various steps in FIG. 7 could overlap, occur in parallel, occur in a different order, or occur any number of times (including zero times). Also, while certain hashtags are shown in FIG. 7 for illustrative purposes, it will be understood that any subject matter and associated hashtags can be used depending on the nature of the particular content items.

Figure 8:
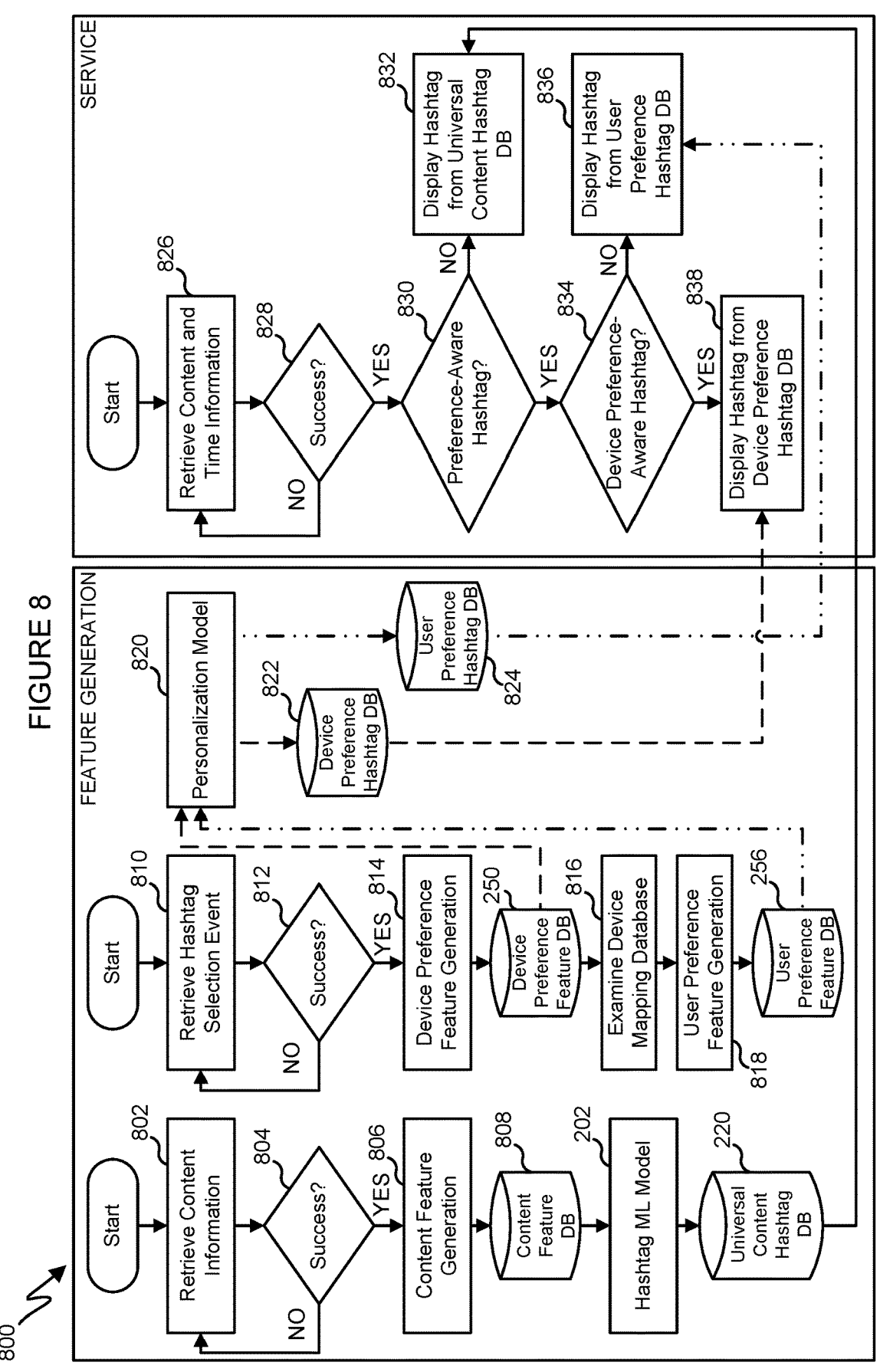
FIG. 8 illustrates an example process for generating hashtags in accordance with this disclosure.

FIG. 8 illustrates an example process 800 for generating hashtags in accordance with this disclosure. For ease of explanation, the process 800 shown in FIG. 8 is described as being implemented on or supported by the server 106 in the network configuration 100 of FIG. 1. However, the process 800 could be used with any other suitable device(s) and in any other suitable system(s), such as when the process 800 is implemented on or supported by the electronic device 101.

As shown in FIG. 8, content information is retrieved at step 802 as part of a feature generation portion of the process 800. This can include the processor 120 retrieving content stored on a storage device or that is being currently requested for consumption by a user device. At step 804, it is determined whether the retrieval of the content information was successful. If so, at step 806, a content feature generation operation is performed to generate content features from the content information. The content feature generation operation can include the processor 120 performing the key frame extraction operation 226, the audio-to-text operation 232, and/or the feature extraction operation 214 using the retrieved content information. In various embodiments, the content features generated by the content feature generation operation can be stored in a content feature database 808. The content features are provided to the hashtag machine learning model 202, which generates and outputs one or more universal content hashtags that can be stored in the universal content hashtag database 220. This may be done as described above with respect to FIGS. 2A and 2B.

Device-level and user-level preference information can also be determined for the hashtags. At step 810, at least one hashtag selection event is retrieved. This can include the processor 120 looking up in a hashtag history database 224 whether a user has previously selected a hashtag. For instance, the hashtag history database 224 may indicate that device X clicked hashtag Y at T time. At step 812, it is determined whether retrieval of the hashtag selection event(s) was successful. If so, at step 814, a device preference features generation operation is performed to generate device-level preferences. This can include the processor 120 executing the device preference feature layer 248 to generate one or more device-level preference features for one or more devices and storing the one or more device-level preference features in the device preference feature database 250.

At step 816, the user and device mapping database 244 is examined to determine multiple devices associated with a user and can also include retrieving multiple device preference features from the device preference features databases 250. At step 818, a user preference features generation operation is performed to generate one or more user-level preferences. This can include the processor 120 executing the user preference feature layer 254 using device preference features for multiple devices retrieved from the device preference feature databases 250. The one or more user-level preference features can be stored in the user preference feature database 256.

Each of the device-level and user-level preference features can be provided to a personalization model 820. The personalization model 820 is configured to process one or more of the device-level and user-level preference features along with hashtags and associated hashtag features generated by the hashtag machine learning model 202. One or more device preference-aware hashtags and associated information or one or more user preference-aware hashtags and associated information can be stored in a device preference hashtag database 822 or a user preference hashtag database 824, respectively. In some embodiments, the personalization model 820 can represent the personalization machine learning model 242 or the personalization distance model 705.

In some embodiments, the personalization model 820 may represent the personalization machine learning model 242 and may also use a Monte Carlo simulation technique to predict possible outcomes. For example, device/user preference features can be extracted and input to the personalization machine learning model 242 that uses the Monte Carlo simulation technique. The output from the model is a re-calculated score between each hashtag and the device/user preferences, and the hashtags are reordered as described in this disclosure. The personalization model 820 calculates a sum of all the scores, which in some cases can be expressed as follows.

$$Total\_Score = \sum_{h=1}^{H} Score_h$$

Here, H is the number of recommended hashtags. The personalization model 820 remakes each hashtag's score by dividing it with the Total_Score, which can be expressed as follows.

$$Hashtag\_Score\_By\_Total = \left[ \frac{Score_1}{Total\_Score}, \right.$$
$$\left. \frac{Score_2}{Total\_Score}, \cdots , \frac{Score_D}{Total\_Score} \right]$$

A random choice by probability can be performed using the personalization model 820 to select a hashtag as influenced by the probabilities. In some cases, this can be expressed as follows.

numpy.random.choice(hashtag_list,
        probability_list=Hashtag_Score_By_Total)

As shown in FIG. 8, during a service portion of the process 800, at step 826, content and optionally time information are retrieved for a content item. The service portion of the process 800 can involve the user of the content service application 222. At step 828, it is determined whether the content and optionally time information were successfully retrieved. If so, at step 830, it is determined whether one or more preference-aware hashtags are to be recommended. If not, at step 832, one or more hashtags from the universal content hashtag database are recommended and/or displayed. If, at step 830, it is determined that one or more preference-aware hashtags are to be recommended, the process 800 moves to step 834. At step 834, it is determined whether one or more device preference-aware hashtags are to be recommended. If not, at step 836, one or more hashtags from the user preference hashtag database are recommended and/or displayed. If, at step 834, it is determined that one or more device preference-aware hashtags are to be recommended, the process 800 moves to step 838. At step 838, one or more hashtags from the device preference hashtag database are recommended and/or displayed.

Although FIG. 8 illustrates one example process 800 for generating hashtags, various changes may be made to FIG. 8. For example, while shown as a series of steps, various steps in FIG. 8 could overlap, occur in parallel, occur in a different order, or occur any number of times (including zero times).

Figure 9:
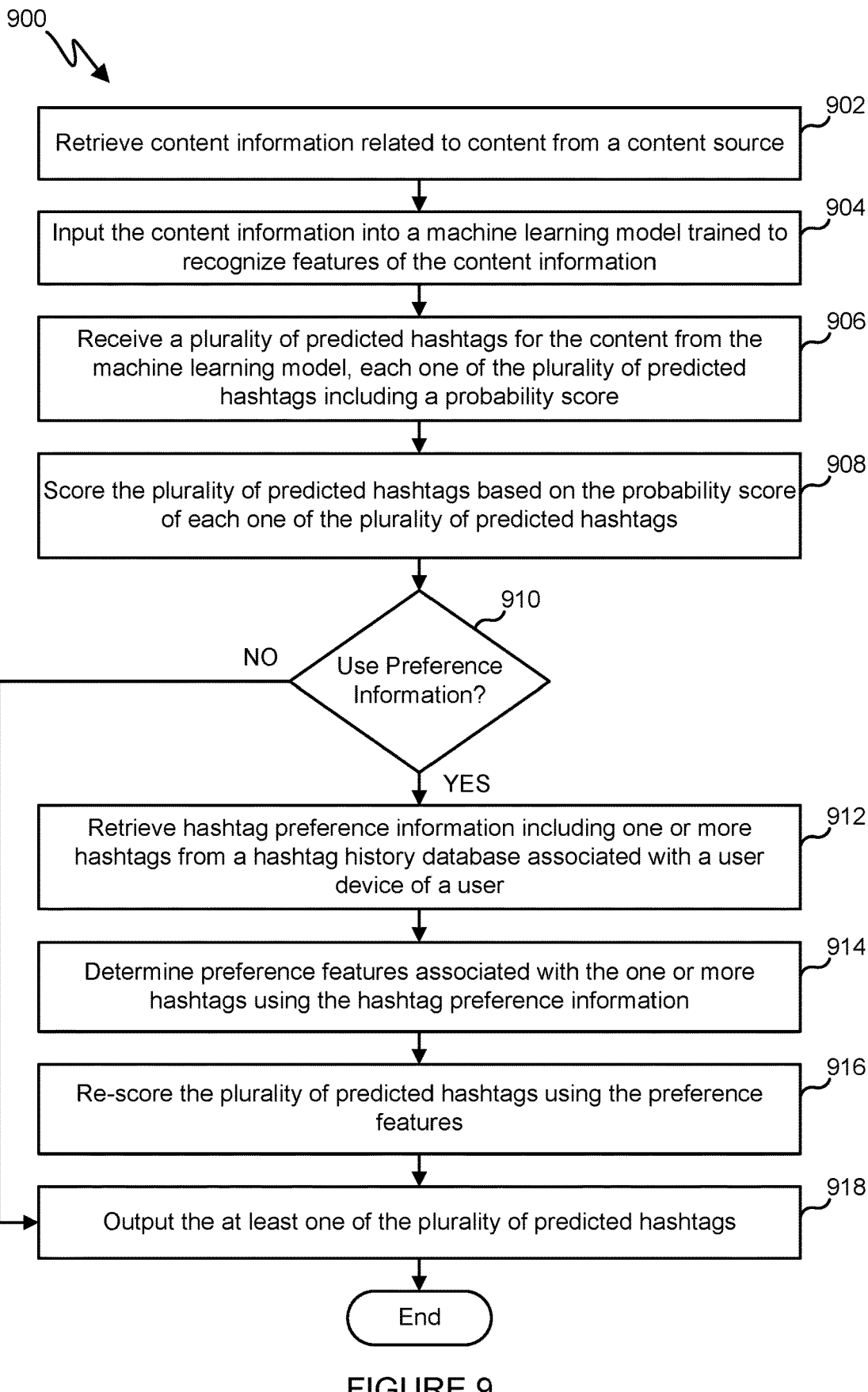
FIG. 9 illustrates an example method for generative artificial intelligence and preference-aware hashtag generation in accordance with this disclosure.

FIG. 9 illustrates an example method 900 for generative artificial intelligence and preference-aware hashtag generation in accordance with this disclosure. For ease of explanation, the method 900 shown in FIG. 9 is described as being performed using the server 106 in the network configuration

100 of FIG. 1. However, the process 600 may be used with any other suitable device(s), such as the electronic device 101, and in any other suitable system(s).

At step 902, content information related to content is retrieved from a content source. At step 904, the content information is input into a machine learning model that is trained to recognize features of the content information. This can include the processor 120 using the feature extraction operation 214 to extract features of the content and providing the extracted features to the machine learning model, such as the hashtag machine learning model 202. At step 906, a plurality of predicted hashtags for the content are received from the machine learning model, where each one of the plurality of predicted hashtags includes a probability score. In various embodiments, at least one of the plurality of predicted hashtags is based at least in part on time information of the content information as described in this disclosure. At step 908, the hashtags of the plurality of predicted hashtags are scored/sorted based on the probability score of each one of the plurality of predicted hashtags.

At step 910, it is determined whether to use preference information in the hashtag generation. For example, this determination could be made based on a set implementation for the hashtag generation system or could be based on one or more settings or preferences of the system or of a user. In some embodiments, the determination may be based on identifying whether any preference information currently exists in the system. If it is determined at step 910 that no preference information is to be used, at step 918, the at least one of the plurality of predicted hashtags is output. This can include the processor 120 displaying, such as on a display 160, the plurality of predicted hashtags. In various embodiments described in this disclosure, the display can include a user interface that allows the processor 120 to receive a user input that selects a hashtag of the plurality of predicted hashtags and to cause a display, such as on the display 160, of a plurality of content items associated with the selected hashtag and a set of additional hashtags each displayed in association with one of the plurality of content items.

If it is determined at step 910 that preference information is to be used, at step 912, hashtag preference information including one or more hashtags is retrieved from a hashtag history database associated with a user device of a user. This can include the processor 120 retrieving hashtag history information from the hashtag history database 224. In various embodiments, the hashtag history database 224 includes, in association with each hashtag in the hashtag history database 224, an identification of whether the user has previously selected the hashtag. In some embodiments, the hashtag history database 224 is associated with a plurality of user devices, and the hashtag preference information includes preference information associated with each one of the plurality of user devices.

At step 914, one or more preference features associated with the one or more hashtags are determined using the hashtag preference information. In some embodiments, determining the one or more preference features includes inputting the hashtag preference information into another machine learning model, where the other machine learning model is trained to consolidate features included in the hashtag preference information associated with the one or more hashtags and output the one or more preference features. This can include the processor 120 executing the device preference features layer 248 and/or the user preference feature layer 254 to extract one or more preference features at the device and/or user level. At step 916, each of the plurality of predicted hashtags is re-scored using the one or more preference features. This can include the processor 120 executing a personalization model such as the personalization machine learning model 242. In some embodiments, a personalization distance model can be used to calculate distances between first features included in the hashtag preference information and second features of the plurality of predicted hashtags. At step 918, the re-scored hashtags can be output, such as for display to a user.

Although FIG. 9 illustrates one example of a method 900 for generative artificial intelligence hashtag generation, various changes may be made to FIG. 9. For example, while shown as a series of steps, various steps in FIG. 9 could overlap, occur in parallel, occur in a different order, or occur any number of times (including zero times).

It should be noted that the functions shown in FIGS. 2 through 9 or described above can be implemented in an electronic device 101, 102, 104, server 106, or other device(s) in any suitable manner. For example, in some embodiments, at least some of the functions shown in FIGS. 2 through 9 or described above can be implemented or supported using one or more software applications or other software instructions that are executed by the processor 120 of the electronic device 101, 102, 104, server 106, or other device(s). In other embodiments, at least some of the functions shown in FIGS. 2 through 9 or described above can be implemented or supported using dedicated hardware components. In general, the functions shown in FIGS. 2 through 9 or described above can be performed using any suitable hardware or any suitable combination of hardware and software/firmware instructions. Also, the functions shown in FIGS. 2 through 9 or described above can be performed by a single device or by multiple devices. For instance, the server 106 might be used to train the various machine learning models, and the server 106 could deploy the trained machine learning models to one or more other devices (such as the electronic device 101 or another server 106) for use.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

retrieving, using at least one processing device of an electronic device, content information related to content from a content source;

inputting, using the at least one processing device, the content information into a machine learning model, wherein the machine learning model is trained to recognize features of the content information using a combination of at least two of video, audio, and metadata features extracted from the content;

receiving, using the at least one processing device, a plurality of predicted hashtags for the content from the machine learning model, wherein the plurality of predicted hashtags is generated by the machine learning model using the input content information, and wherein each one of the plurality of predicted hashtags includes a probability score;

scoring, using the at least one processing device, the plurality of predicted hashtags based on the probability score of each one of the plurality of predicted hashtags;

retrieving hashtag preference information including one or more hashtags from a hashtag history database associated with a user device of a user;

determining one or more preference features associated with the one or more hashtags using the hashtag preference information;

re-scoring and sorting the plurality of predicted hashtags using the one or more preference features; and outputting, using the at least one processing device, at least one of the plurality of predicted hashtags.

2. The method of claim 1, wherein at least one of the plurality of predicted hashtags is based at least in part on time information of the content information.

3. The method of claim 1, wherein:

determining the one or more preference features comprises inputting the hashtag preference information into another machine learning model; and the other machine learning model is trained to consolidate features included in the hashtag preference information associated with the one or more hashtags and output the one or more preference features.

4. The method of claim 1, wherein determining the one or more preference features comprises calculating distances between first features included in the hashtag preference information and second features of the plurality of predicted hashtags.

5. The method of claim 1, wherein the hashtag history database includes, in association with each hashtag in the hashtag history database, an identification of whether the user has previously selected the hashtag.

6. The method of claim 1, wherein:

the hashtag history database is associated with a plurality of user devices; and the hashtag preference information includes preference information associated with each one of the plurality of user devices.

7. The method of claim 1, further comprising:

displaying, on a display, the plurality of predicted hashtags;

receiving a user input selecting a hashtag of the plurality of predicted hashtags;

displaying, on the display, a plurality of content items associated with the selected hashtag; and displaying, on the display, a set of additional hashtags, wherein each hashtag of the set of additional hashtags is displayed in association with one of the plurality of content items.

8. An electronic device comprising:

at least one processing device configured to:

retrieve content information related to content from a content source;

input the content information into a machine learning model, wherein the machine learning model is trained to recognize features of the content information using a combination of at least two of video, audio, and metadata features extracted from the content;

receive a plurality of predicted hashtags for the content from the machine learning model, wherein the plurality of predicted hashtags is generated by the machine learning model using the input content information, wherein each one of the plurality of predicted hashtags includes a probability score;

score the plurality of predicted hashtags based on the probability score of each one of the plurality of predicted hashtags;

retrieve hashtag preference information including one or more hashtags from a hashtag history database associated with a user device of a user;

determine one or more preference features associated with the one or more hashtags using the hashtag preference information;

re-score and sort the plurality of predicted hashtags using the one or more preference features; and output at least one of the plurality of predicted hashtags.

9. The electronic device of claim 8, wherein at least one of the plurality of predicted hashtags is based at least in part on time information of the content information.

10. The electronic device of claim 8, wherein:

to determine the one or more preference features, the at least one processing device is configured to input the hashtag preference information into another machine learning model; and the other machine learning model is trained to consolidate features included in the hashtag preference information associated with the one or more hashtags and output the one or more preference features.

11. The electronic device of claim 8, wherein, to determine the one or more preference features, the at least one processing device is further configured to calculate distances between first features included in the hashtag preference information and second features of the plurality of predicted hashtags.

12. The electronic device of claim 8, wherein the hashtag history database includes, in association with each hashtag in the hashtag history database, an identification of whether the user has previously selected the hashtag.

13. The electronic device of claim 8, wherein:

the hashtag history database is associated with a plurality of user devices; and the hashtag preference information includes preference information associated with each one of the plurality of user devices.

14. The electronic device of claim 8, wherein the at least one processing device is further configured to:

display, on a display, the plurality of predicted hashtags;

receive a user input selecting a hashtag of the plurality of predicted hashtags;

display, on the display, a plurality of content items associated with the selected hashtag; and display, on the display, a set of additional hashtags, wherein each hashtag of the set of additional hashtags is displayed in association with one of the plurality of content items.

15. A non-transitory machine readable medium containing instructions that when executed cause at least one processor of an electronic device to:

retrieve content information related to content from a content source;

input the content information into a machine learning model, wherein the machine learning model is trained to recognize features of the content information using a combination of at least two of video, audio, and metadata features extracted from the content;

receive a plurality of predicted hashtags for the content from the machine learning model, wherein the plurality of predicted hashtags is generated by the machine learning model using the input content information, wherein each one of the plurality of predicted hashtags includes a probability score;

score the plurality of predicted hashtags based on the probability score of each one of the plurality of predicted hashtags;

retrieve hashtag preference information including one or more hashtags from a hashtag history database associated with a user device of a user;

determine one or more preference features associated with the one or more hashtags using the hashtag preference information;

re-score and sort the plurality of predicted hashtags using the one or more preference features; and output at least one of the plurality of predicted hashtags.

16. The non-transitory machine readable medium of claim 15, wherein:

the instructions that when executed cause the at least one processor to determine the preference features comprise instructions that when executed cause the at least one processor to input the hashtag preference information into another machine learning model; and the other machine learning model is trained to consolidate features included in the hashtag preference information associated with the one or more hashtags and output the one or more preference features.

17. The non-transitory machine readable medium of claim 15, further containing instructions that when executed cause the at least one processor to:

display, on a display, the plurality of predicted hashtags;

receive a user input selecting a hashtag of the plurality of predicted hashtags;

display, on the display, a plurality of content items associated with the selected hashtag; and display, on the display, a set of additional hashtags, wherein each hashtag of the set of additional hashtags is displayed in association with one of the plurality of content items.

* * * * *